United States Patent

Fenton

[15] 3,692,849
[45] Sept. 19, 1972

[54] PREPARATION OF ALLYL ALCOHOL FROM BUTYROLACTONE

[72] Inventor: Donald M. Fenton, 2861 Alden Place, Anaheim, Calif. 92806

[22] Filed: Oct. 10, 1969

[21] Appl. No.: 865,488

[52] U.S. Cl........260/638 R, 23/204 M, 260/614 AA
[51] Int. Cl.............................C07c 33/02, C08f 3/36
[58] Field of Search.......................260/635 0, 638 R

[56] References Cited

OTHER PUBLICATIONS

Prince et al., " Chem. Abstracts," Vol. 70, (1969), pp. 248, 249, item 71394n, QD1A51.
Tsuji et al., " Chem. Abstracts," Vol. 66, (1967), p. 3543, item 37390r, QD1A51.
Ohno et al., " Chem. Abstracts," Vol. 68, (1968), p. 3867, item 39718u, QD1A51.
House, " Modern Synthetic," (1965), pages 168, 169, 242, QD 262. H67.
Wagner et al., " Synthetic Organic Chemistry," (1953), pages 422, 426 to 430, QD 262 W4.

*Primary Examiner*—Leon Zitver
*Assistant Examiner*—Joseph E. Evans
*Attorney*—Milton W. Lee, Richard C. Hartman, Lannas S. Henderson, Dean Sandford and Robert E. Strauss

[57] ABSTRACT

Allyl alcohol is prepared by contacting butyrolactone with a liquid reaction medium comprising a minor amount of a Group VIII noble metal. The lactone decomposes releasing carbon monoxide and forming allyl alcohol, a useful polymerization monomer.

12 Claims, No Drawings

PREPARATION OF ALLYL ALCOHOL FROM BUTYROLACTONE

DESCRIPTION OF THE INVENTION

The invention relates to the production of mono-unsaturated alcohols from lactones. More particularly, the invention relates to a process of forming allyl alcohol by decomposing butyrolactone.

Allyl alcohol is presently produced by hydrolyzing allyl chloride, isomerizing propylene oxide or dehydrating propylene glycol. These processes all consume valuable raw materials and thus a process whereby allyl alcohol is produced from an alternate raw material is desirable.

An object of the invention is to provide a process for production of an unsaturated alcohol from a lactone.

Another object of the invention is to prepare allyl alcohol from butyrolactone.

Other and related objects of the invention will be apparent from the following discussion.

According to the invention, allyl alcohol and its alkyl derivatives are prepared by contacting a butyrolactone with a reaction medium comprising a Group VIII noble metal, preferably in complex association with a biphyllic ligand to be defined hereinafter. The reaction process according to the following equation:

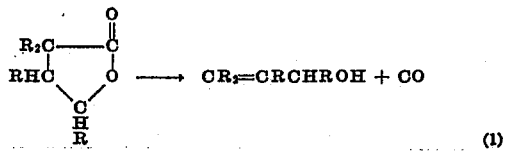

(1)

It can be seen from the foregoing mechanism that the reaction involves the splitting out of a carbonyl group from the lactone, releasing carbon monoxide and forming the unsaturated alcohol.

The lactone reactant of the invention comprises a lactone having four to 16 carbons, preferably four to 12 carbons and having the following five-membered ring structure:

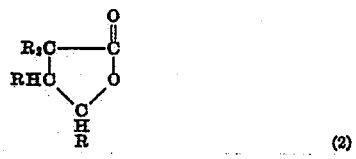

(2)

wherein R is hydrogen or the same or different alkyl.

Examples of useful lactones are γ-butyrolactone, 2-methyl-3-pentyl-γ-butyrolactone, 2-butyl-γ-butyrolactone, 3-ethyl-γ-butyrolactone, 2-octyl-3-methyl-γ-butyrolactone, 2-methyl-3-nonyl-γ-butyrolactone, 2,3-diethyl-γ-butyrolactone, 4-hexyl-γ-butyrolactone, 2-diethyl-γ-butrolactone, etc.

The catalyst of the invention comprises a Group VIII noble metal preferably in complex association with a biphyllic ligand. The Group VIII noble metal may be ruthenium, rhodium, palladium, osmium, iridium, or platinum, preferably rhodium, palladium, iridium, or platinum, and most preferably palladium due to its greater activity. A catalytic quantity of the metal is added (e.g., 0.002–2 weight percent of the reaction medium) and the metal may be added as a soluble salt, a carbonyl, a hydride or as a chelate.

Examples of suitable sources of the noble metals are as follows: iridium carbonyl chloride, iridium carbonyl, iridium tetrabromide, iridium tribromide, iridium triflouride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, sodium hexachloroplatinate, potassium trichloro(ethylene)platinate (II), chloropentaamminorhodium (III) chloride, rhodium dicarbonyl chloride dimer, rhodium nitrate, rhodium trichloride, rhodium carbonyl hydride, ruthenium trichloride, tetraamminorutheniumhydroxychloro chloride; etc. Generally the halide salt and particularly the chloride salt are preferred sources of the Group VIII noble metal (e.g., palladium chloride, rhodium chloride, etc.) Salts other than the Group VIII noble metal salts may be added to promote the reaction such as the alkali and alkaline earth metal halides, e.g., lithium chloride, sodium chloride, potassium bromide, calcium iodide, etc.

The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise organic compounds having at least about three carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R)_3$$

wherein E is trivalent phosphorus, arsenic antimony or bismuth; and wherein R is the same or different alkyl having one to about 10 carbons, cycloalkyl having four to about 10 carbons and/or aryl having six to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc. and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)-phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphosphine, tricumenylphosphine, trixylylbismuthine, etc. Of the aforementioned, the aryl phosphines and particularly the triarylphosphines (e.g., triphenylphosphine) are preferred because of their greater activity.

The Group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10-300 percent of that stoichiometrically required to form a complex with the Group VIII metal). The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc., may be but need not be included in the complex catalyst of this invention. These components may be incorporated in the catalyst by the formation of the catalyst complex from a Group VIII noble metal salt of the indicated anions. A preferred complex is one comprising at least one halide ligand, e.g., chloride, iodide, or bromide, or at least one $C_1$–$C_5$ carboxylate, e.g., acetate, propionate, butyrate, etc., since these groups, particularly halide, have been shown to improve the activity of the catalyst.

The reaction is performed under liquid phase conditions and can be conducted in the presence of a suitable inert organic liquid, preferably a liquid which is a solvent for the reactants and catalyst. Suitable liquids include hydrocarbons, ketones, esters, ethers or a carboxylic acid. Suitable liquids are exemplified by hexane, heptane, octane, benzene, toluene, cyclohexane, cyclodecane, methyl, ethyl, ketone, diethyl ketone, ethyl n-butyl ketone, cyclohexanone, butyl ether, methyl tolyl ether, di-iso-amyl ether, methyl acetate, ethyl acetate, acetic acid, benzoic acid, etc.

The reaction can also be conducted in the absence of the above liquids by conducting the reaction in an excess of the reactant lactone, e.g., two to 100 times that stoichiometrically required for the reaction. This can be accomplished for example in the batch process, by terminating the reaction prior to most of the lactone being converted, or for example in the continuous process by adding sufficient lactone to maintain the desired excess.

The reaction may be conducted at moderate temperatures and pressures, e.g., temperatures of 50°–400°C., preferably 100°–300°C. and pressures of 1–200 atmospheres absolute, preferably 1–10 atmospheres.

The reaction can be performed batchwise or in a continuous fashion. When operating batchwise, the catalyst, the reaction medium, and the lactone can be introduced into the reaction zone to form a liquid phase therein and the reaction zone can be heated to the desired reaction temperature. When performing the reaction in a continuous fashion the liquid components can be charged to the reaction zone to form a liquid phase therein and the lactone continuously introduced into the reaction zone to contact the reaction medium containing the catalyst.

The carbon monoxide can be withdrawn overhead and the unsaturated alcohol produce withdrawn separately from the reaction zone by withdrawing a stream of the liquid reaction medium and distilling the unsaturated alcohol product therefrom. Unreacted lactone may be recycled to the reaction zone.

EXAMPLE 1

The following example illustrates the invention and demonstrates the results actually obtained:

To a 250 milliliter 3-necked flask equipped with a Dean Stark tube were added 200 milliliters γ-butyrolactone, one gram palladium chloride bis(triphenylphosphine), and one gram lithium chloride. The mixture was stirred and heated to reflux (about 200°C.). About 5 milliliters of liquid product was collected and analyzed to reveal that allyl alcohol and a minor amount of diallyl ether was formed in the process.

EXAMPLE 2

The following example illustrates other modes of practice presently contemplated herein:

To the flask of Example 1 may be added 400 milliliters 3-methyl-4-pentyl-γ-butyrolactone and 10 grams rhodium tribromide. The flask is heated to about 300°C. for 6 hours. The liquid contents are removed and 2-methyl-1-pentyl allyl alcohol recovered by distillation.

To the flask may be added 300 milliliters of 3-hexyl-γ-butyrolactone and 20 grams iridium nitrate. The flask is heated to and maintained at 350°C. for 5 hours. The liquid contents are removed and 2-hexylallyl alcohol recovered by distillation.

To the flask may be added 200 milliliters of butyrolactone, 10 grams palladium chloride and 20 grams tributylstibine. The flask is heated to and maintained at 200°C. for about 5 hours. The liquid contents are removed and allyl alcohol separated by distillation.

The preceding examples are intended solely to illustrate the invention and are not be construed as unduly limiting thereof.

I claim:

1. A process for the preparation of a mono-unsaturated alcohol comprising contacting, at a temperature of 50°–400°C. and a pressure of 1–200 atmospheres, a lactone having from four to 16 carbons and having the structure:

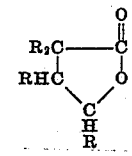

wherein each R is hydrogen or the same or different alkyl with a liquid reaction medium comprising said lactone and an inert organic solvent and containing a Group VIII noble metal in complex association with a biphyllic ligand having the structure:

wherein E is trivalent phosphorus, arsenic, antimony or bismuth; and wherein each R´ is the same or different alkyl having from one to about 10 carbons, cycloalkyl having from four to about 10 carbons or aryl having from six to about 10 carbons, the concentration of said noble metal being from 0.002–2 weight percent based on the weight of said reaction medium.

2. The method of claim 1 wherein said Group VIII noble metal is rhodium, palladium, iridium, or platinum.

3. The method of claim 1 wherein said Group VIII noble metal is palladium.

4. The method of claim 1 wherein said biphyllic ligand is an aryl phosphine.

5. The method of claim 1 wherein said biphyllic ligand is triphenylphosphine.

6. The method of claim 5 wherein said temperature is maintained at 100° to 300°C. and the pressure from 1 to 10 atmospheres.

7. The The method of claim 1 wherein said lactone is butyrolactone.

8. The method of claim 1 wherein said Group VIII noble metal is palladium and wherein said lactone is butyrolactone.

9. The method of claim 8 wherein said biphyllic ligand is triphenylphosphine.

10. A process comprising contacting butyrolactone with a liquid reaction medium comprising an inert organic solvent and said butyrolactone and containing from 0.002 to 2 weight percent of a palladium salt soluble in said reaction medium and in complex association with triarylphosphine, wherein the aryl group contains from six to 10 carbons; said contacting being conducted at a temperature of 50° to 400°C. and a pressure of 1 to 200 atmospheres and sufficient to maintain liquid phase.

11. A process for the preparation of a mono-unsaturated alcohol comprising contacting, at a temperature of 50°–400°C. and a pressure of 1–200 atmospheres, a lactone having from four to 16 carbons and having the structure:

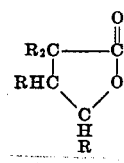

wherein each R is hydrogen or the same or different alkyl with a Group VIII noble metal in complex association with a biphyllic ligand having the structure:

wherein E is trivalent phosphorus, arsenic, antimony or bismuth; and wherein each R´ is the same or different alkyl having from one to about 10 carbons, cycloalkyl having from four to about 10 carbons or aryl having from six to about 10 carbons, the concentration of said noble metal being from 0.002–2 weight percent of said lactone.

12. The method of claim 11 wherein said lactone is butyrolactone.

* * * * *